Aug. 14, 1928.

F. H. FIELD

TRUCK

Filed Sept. 13, 1926

1,680,531

Inventor
FRANK H. FIELD
By Clarence S. Walker
His Attorney

Patented Aug. 14, 1928.

1,680,531

UNITED STATES PATENT OFFICE.

FRANK H. FIELD, OF JAMESTOWN, NEW YORK.

TRUCK.

Application filed September 13, 1926. Serial No. 135,262.

This invention relates to an improvement in a truck, and more particularly in the body of the truck, which is so constructed that delivery can be made from the front of the truck beside the driver's seat, thus obviating the necessity for the driver to go to the rear of the truck in order to remove and deliver the desired article.

This invention is shown in the drawing as embodied in an ice truck, but it is obvious that it can be used for many other purposes, and while it is described as used for that particular purpose applicant is not limited thereto, such description being for purpose of illustration only.

While many attempts have previously been made in the delivery of ice from house to house to use a motor truck, such use has formerly been found slower and more expensive than the use of a horse-drawn vehicle. When a horse-drawn vehicle is used, and the driver has reached the locality where he delivers ice, the driver can ride on the back step, driving the horse from there, and as each house is reached he can stop the horse, take the ice from the back of the wagon and deliver it without any delay. If, however, a motor truck of the ordinary type is used, the driver must sit behind the wheel and when he reaches the house must alight, go to the back of the truck, withdraw the ice and deliver it.

This takes considerably more time, and to avoid this and save time, when a motor truck is used two men are usually employed, one to drive the truck and the other to deliver the ice. Not only is this more expensive, but even under such conditions there is no saving in time over delivery with the horse-drawn vehicle.

Furthermore, the presence of the step at the back of the wagon is a constant temptation for children and many accidents have occurred by reason of it.

The object of the present invention is to avoid these objections by so constructing the truck body that ice is delivered from the front at the side of the driver's seat, and not from the back of the wagon. Obviously with such a truck body, when the driver reaches the house he can pick up the ice as he alights from the cab. This has been found to be a great saving in time, so that one man with such a truck can deliver ice much more rapidly than can a man with a horse-drawn vehicle.

Other objects of this invention reside in the details of construction which are set forth below in the specification and in the drawings, which form a part thereof, and in which Fig. 1 is a perspective side view of a motor truck embodying this invention;

Figure 4:
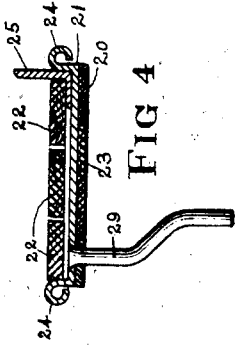
Fig. 4 is a sectional view taken along the line 4—4 of Figure 2.

Referring to the drawings, the reference numeral 10 is employed to designate a motor truck on which is mounted a body 11, made in accordance with this invention. While the windshield 12 of the truck extends completely across the chassis, the roof of the cab 13 covers simply the driver's seat 14, extending only partway across the chassis, (see particularly in this connection Figures 2 and 3). By reason of this fact, it is obvious that the driver is free to stand upright on the platform 15.

The body 11 comprises side walls 16 and 17, and a back wall or tail gate 18, which may be hinged or secured in place in any desired manner. The provision of the tail gate 18 is not essential, and if desired can be omitted, the back wall being rigidly secured to the side walls 16 and 17.

The body 11 is supported above the frame of the truck by a plurality of cross members 19, the members at the rear being slightly higher than those at the front, so that the floor 20 of the truck is inclined downwardly toward the front. The floor 20 is provided with a metal lining 21, on which are supported a plurality of slats 22 spaced from each other to allow the water from the ice to pass down on to the lining 21.

Figure 2:
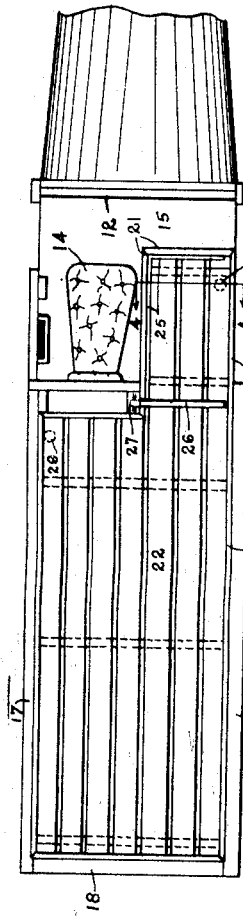
Fig. 2 is a plan view on a smaller scale of the truck body, and showing the relation of the driver's seat to the body.
Figure 1:
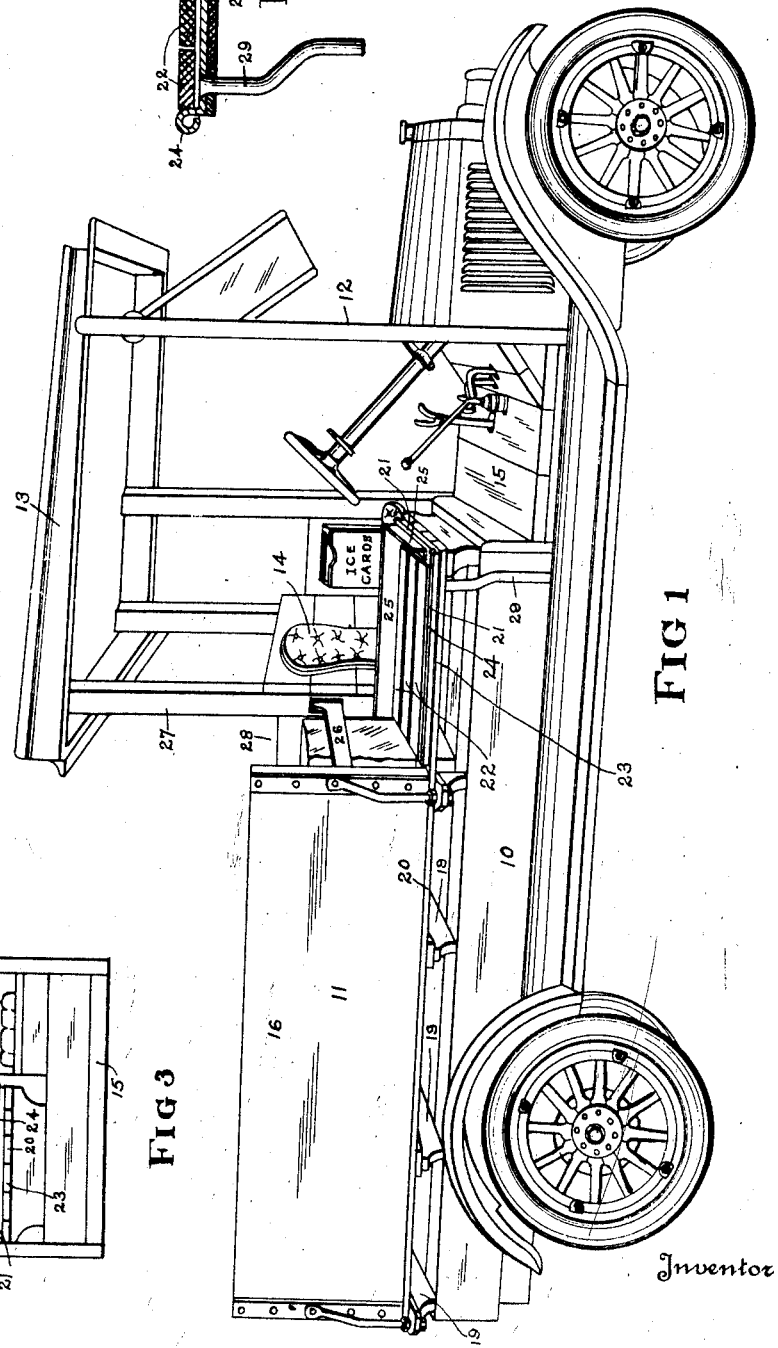
Figure 3:
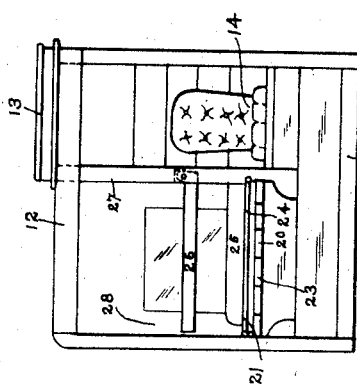
Fig. 3 is a front elevation showing particularly the relation of the delivery platform to the driver's seat.

Referring particularly to Figures 1 and 2 it will be noted that the floor 20 is extended beside the driver's seat to provide a platform 23, the lining 21 and slats 22 being similarly continued. At three sides of the platform 23, the lining 21 terminates in a flange 24, and in addition to this, at the front and inner edge of the platform are mounted plates 25, which extend above the edge of the flanges 24 for the reasons to be described below.

A gate or barrier 26, pivotally mounted on one of the uprights 27 of the cab 13 normally extends across the opening 28 between the wall 16 and the cabinet, to prevent the ice in the body 11 from sliding onto the delivery platform 23, due to the inclination of the floor 20, as the truck is in motion. In the floor 20 behind the driver's seat 14 and in the delivery platform 23 are provided drains 29, by which any water from the ice can escape to the ground without difficulty.

The use of the wagon is substantially as follows: When the driver reaches the desired house, as he stops the truck, he lifts the barrier 26 and allows the ice to slide down on to the platform 23. Due to the narrow width of the cab roof, the driver is free to stand upright on the platform 15 and can lift the ice from the delivery platform 23, as he steps off the truck. The plates 25 prevent the ice from sliding off the front or the inner edge of the platform, but are omitted at the outer edge so that the driver can slide the cake off as he alights.

While one embodiment of this invention has been shown and described, applicant is not limited thereto, since it is obvious that other embodiments can be made without departing from the spirit and scope of this invention as set forth in the following claims.

Having thus set forth my invention what I claim as new and for which I desire protection by Letters Patent is:

1. In a vehicle the combination of a driver's seat, a body comprising a main part and a delivery platform forming an extension thereof at the side of said driver's seat, and a vertically removable barrier separating said delivery platform from the main part of the body.

2. In a vehicle for carrying ice, a body the floor of which is inclined forwardly, a driver's seat, a delivery platform forming a part of said body at the side of said seat, and a vertically removable barrier separating said delivery platform from the main part of the body and preventing the ice therein from sliding onto said platform.

3. An ice delivery truck, including a body having a driver's compartment; having a floor board disposed below the level of the bottom of the body and further having a delivery opening for receiving cakes of ice therethrough adjacent the front end of the body, a driver's seat in the compartment, releasable control means formed to engage the ice cakes so as to normally hold same against movement out of the delivery opening, and a platform disposed in substantially the plane of the bottom of the body at one side thereof and opposite to said seat and in register with the opening, said bottom and said platform being each formed to support the ice cakes so that the latter can be slid along the bottom, through the opening and thence onto the platform and finally slid off of the outer side edge of the platform.

4. An ice delivery truck, including a body having a delivery opening for receiving cakes of ice therethrough adjacent the front end of the body, releasable control means formed to engage the ice cakes so as to normally hold same against movement out of the delivery opening, and a platform disposed in substantially the plane of the bottom of the body and in register with the opening, said bottom and said platform being each formed to support the ice cakes so that the latter can be slid along the bottom, through the opening and thence onto the platform and finally slid off the outer side edge of the platform.

In testimony whereof I have affixed my signature.

FRANK H. FIELD.